Figure 4:
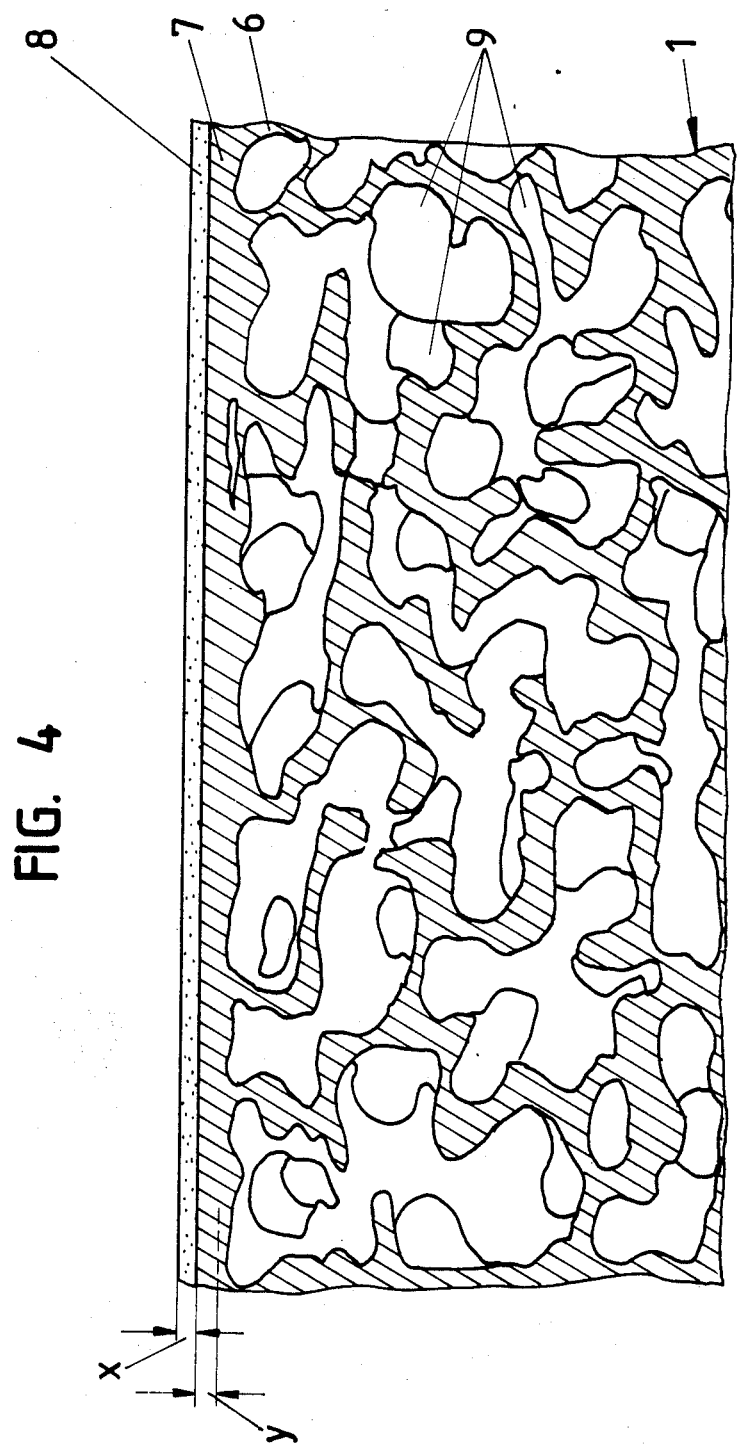

United States Patent [19]

Tschudin-Mahrer

[11] Patent Number: 4,666,768
[45] Date of Patent: May 19, 1987

[54] FOAM PANEL

[75] Inventor: Rolf Tschudin-Mahrer, Lausen/Schweiz, Switzerland

[73] Assignee: Irbit Research & Consulting AG, Fribourg, Switzerland

[21] Appl. No.: 882,606

[22] Filed: Jul. 7, 1986

[30] Foreign Application Priority Data

Jul. 11, 1985 [DE] Fed. Rep. of Germany ... 8520049[U]

[51] Int. Cl.⁴ .......................... B32B 3/26; B32B 7/04; B32B 25/20
[52] U.S. Cl. ............................... 428/318.6; 428/306.6; 428/319.7; 428/447
[58] Field of Search ............... 428/306.6, 307.3, 308.4, 428/318.6, 318.8, 319.7, 447

[56] References Cited

U.S. PATENT DOCUMENTS 3,104,192  9/1963  Hackländer ...................... 428/318.6
3,443,007  5/1969  Hardy ................................. 428/318.8
3,539,144  11/1970 Krug .................................. 428/318.8
3,582,095  6/1971  Bogaert ............................. 428/316.6

FOREIGN PATENT DOCUMENTS 102335  6/1982  Japan ................................. 428/316.6
869565  5/1961  United Kingdom ............. 428/316.6

Primary Examiner—William J. Van Balen
Attorney, Agent, or Firm—Wood, Herron & Evans

[57] ABSTRACT

Foam panel with a skin provided on at least one surface and formed by melting of the foam material, characterized in that the skin is covered by a silicone layer.

2 Claims, 4 Drawing Figures

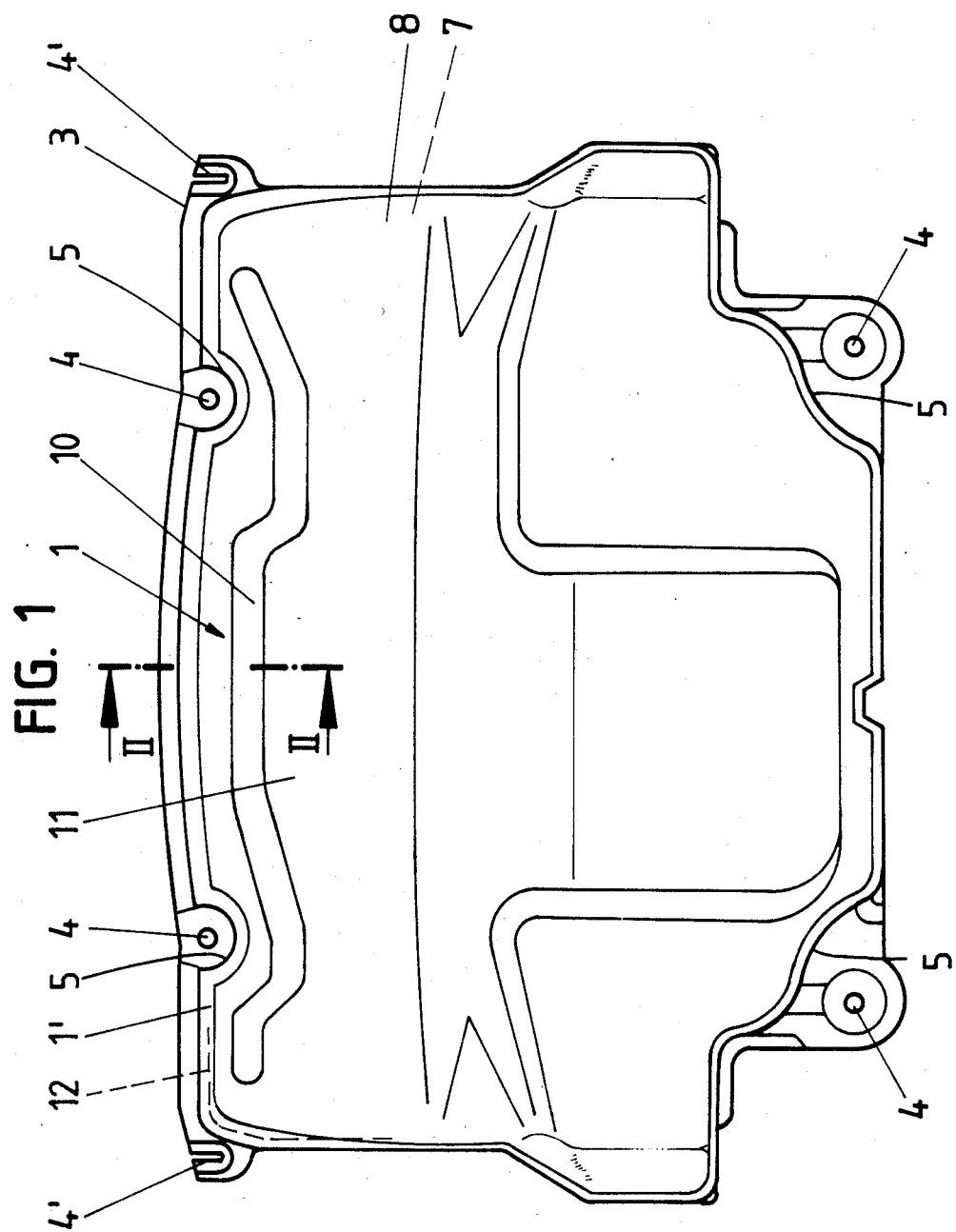

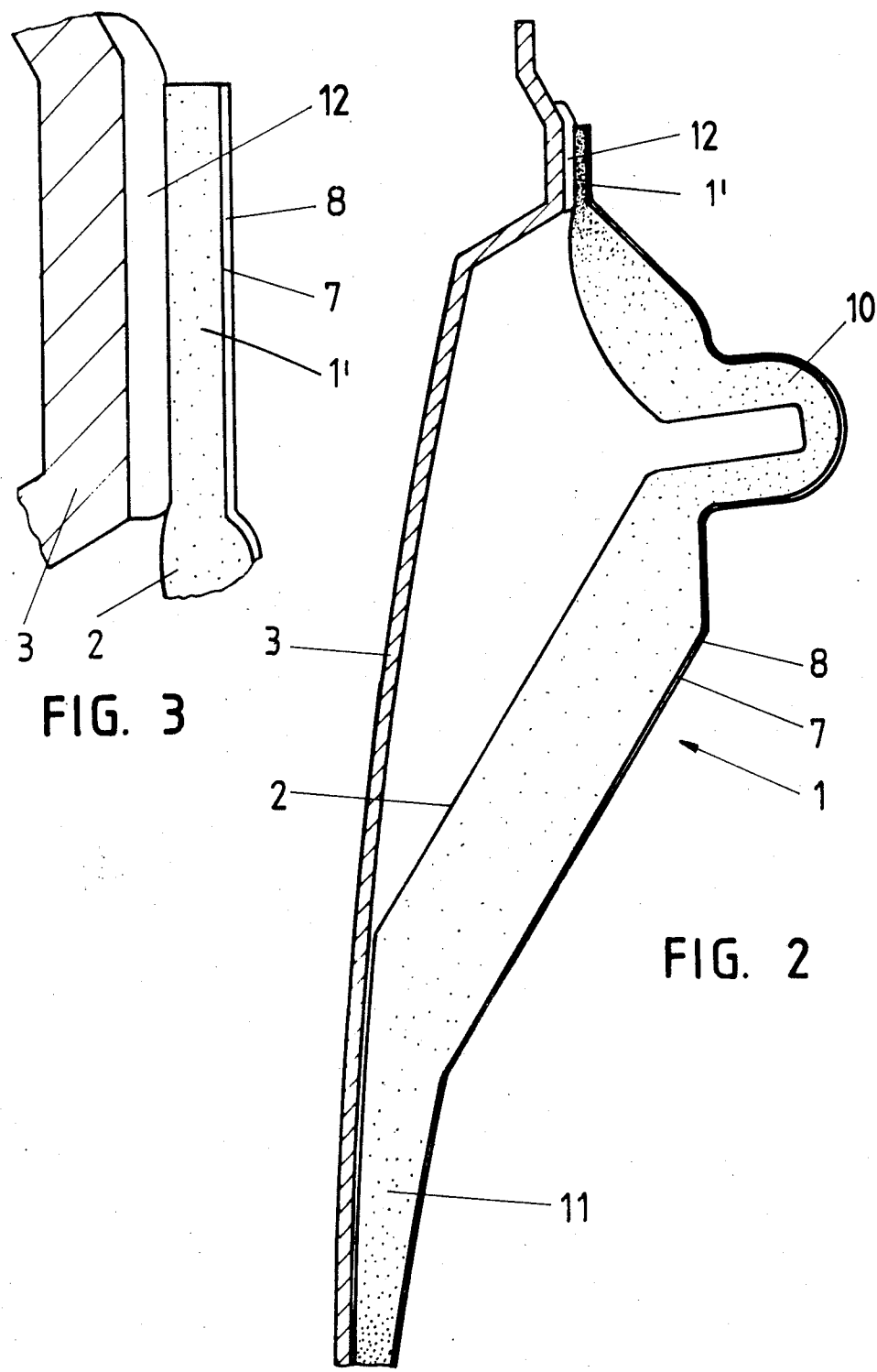

FOAM PANEL

The invention concerns a foam panel with a skin formed on at least one side surface by melting the foam material.

It is previously known, e.g., to line the engine hood of motor vehicles with a soundproofing body from foam material. Such a foam panel is fixed, e.g., by means of a self-adhesive layer applied on its back. Popular are also push-button type mountings or irreversible fasteners. The foam panel side facing the engine compartment has a skin which is to prevent the penetration of water, oil and similar. Open-cell foam material involves the danger of a rather deep penetration of such mediums, which adversely affect the foam panel at least in parts as regards its soundproofing or sound absorption values. The skin can be obtained by application of a foil, which is carried out thermally. The vulnerability of such foil skins, which basically affects also the flexibility of the foam panel, is relatively high. On the other hand, it is known to form the skin by melting of the foam material. Remaining, however, is a permeability because of pores in the skin.

The problem underlying the invention is to so design a categorial foam panel, in a way making it simple to produce and stable in use, that a tight, highly elastic skin is obtained at favorable soundproofing or sound absorption performance.

This problem is inventionally solved in that the skin is covered by a silicone layer.

Realized by such design is a foam panel which will better withstand the mechanical stresses in manufacture, storage, assembly and also later, and which panel also provides the desired soundproofing values. The most favorable compromise is achieved between changes of the soundproofing performance relative to the other mechanical properties, such as tightness, moldability, fluidic friction. The second skin added to that created by melting can be applied surprisingly uniformly, even on a heavily relieved to bizarre surface structure of the foam panel. The silicone layer is applied by spraying. Application by rolling (calendering) or with the aid of a coating blade is recommended for flat structures. Achieved is a high mechanical strength of the dual skin created. The skin proves to be completely impermeable. Its anchoring in the skin impermeable to air and produced by melting of the foam structure results in a high degree of bonding. The silicone layer penetrates no farther than into this skin. The structural area of the foam material behind it retains its uncurtailed elasticity. Due to the great stretchability of the silicone layer applied very thin, a high overall elasticity is obtained which extends into the deepest zones and permits great moldability. This favors greatly the desired objective of reducing the vulnerability of the skin; the skin yields well. Its vulnerability greatly reduced to such extent, a foam panel can be installed even by robots. But in this case a certain minimum surface stability should be observed which, however, when using support panels, stiffener inserts or similar, is readily given. Lastly, it is also advantageous that the thickness of the silicone layer equals about that of the skin. The values range from one to few tenths of a millimeter and may be taken into account as reduction or absorption factor.

The object of the invention will be more fully explained hereafter with the aid of a pictorially illustrated embodiment.

FIG. 1 shows a plan view of the inventionally designed foam panel;

FIG. 2, a section along line II—II in FIG. 1;

FIG. 3, an enlarged sectional presentation of the edge part of the foam panel; and FIG. 4, an enlargement of the foam material provided with the skin and silicone layer.

Fashioned as a sound absorption body, the foam panel 1 consists of open-pore soft foam. As follows partly from FIG. 2, the foam panel is structurally molded. This can be carried out by thermal deep drawing.

For areal stabilization of the foam panel 1, its back 2 is supported by a support panel 3, which latter is a shaped part from plastic. Its shape allows the design required for the application. This design, of course, may vary greatly.

The support panel 3 features along its edge openings 4 for fasteners, which are not illustrated in detail. These openings may be bores or also slots, as can be seen at 4'.

The foam panel 1 features recesses 5 in the area of the openings 4.

The surface of the foam panel 1 facing toward the sound wave has a thin skin 7 produced by closing the foam material structure 6. This skinning is suitably carried out thermally, for instance by passing a heated flat plate over it. This may be performed in a continuous process. When producing specific shaped bodies of such a foam panel 1, the pore edges of the foam structure will close up in deep drawing.

The skin obtained by melting the foam material structure 6 is covered by an applied silicone layer 8.

The silicone layer 8 anchors itself in the tiny pores of the skin 7 which is still permeable to air. But the silicone will not penetrate deeper than into the skin 7. The foam structure itself remains unaffected. The pores 9 of the latter rather retain their coherent cavernous character. As follows from FIG. 4, the thickness x of the silicone layer corresponds essentially to the thickness y of the skin 7.

The overall thickness ranges normally far below 1 mm. Fully retained thereby, the elasticity of the foam structure, combined with the extremely thin skin 7 and, additionally, the great stretchability of the applied silicone, leads to a surprisingly good molding property. Mechanical stresses upon the dual skin are maximally compensated for in this way. The susceptibility to injury is greatly reduced. All of this results in a tightness of the skin which is maintained also under extreme stress. A neutralization of foam sections due to penetrating water, oil etc. cannot occur.

On the other hand, the soundproofing performance is hardly changed by the dual skin, so that the accustomed high absorption values are practically retained. This applies also to zones of the foam panel 1 whose structure is partially compacted, such as can be seen for instance from FIG. 2, be it in the area of a rib 10 produced by deep drawing or of the tapered panel zone 11 in the lower area of FIG. 2.

The foam panel 1 is bonded to the support panel 3. The bonding zone extends as a narrow marginal strip 12 between the compressed marginal zone 1' of the foam panel 1 and the corresponding marginal zone of the support plate 3. The adhesive may be a type responding thermally, so that the support panel 3 and the foam panel 1 can be bonded in one operation.

All of the new characteristics mentioned in the description and illustrated in the drawing are inventionally essential, also as far as they have not been expressly asserted in the claims.

I claim:

1. Foam panel with a skin provided on at least one surface and formed by melting of the foam material, characterized in that the skin (7) is covered by a silicone layer (8).

2. Foam panel according to claim 1, characterized in that the thickness (x) of the silicone coating (silicone layer 8) equals approximately the thickness (y) of the skin (7).

* * * * *